US011651598B2

(12) United States Patent
Bande et al.

(10) Patent No.: US 11,651,598 B2
(45) Date of Patent: May 16, 2023

(54) LANE MAPPING AND LOCALIZATION USING PERIODICALLY-UPDATED ANCHOR FRAMES

(71) Applicant: QUALCOMM Incorporated, San Diego, CA (US)

(72) Inventors: Meghana Bande, Secaucus, NJ (US); Urs Niesen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/816,643

(22) Filed: Aug. 1, 2022

(65) Prior Publication Data

US 2022/0366705 A1     Nov. 17, 2022

Related U.S. Application Data

(63) Continuation of application No. 17/154,169, filed on Jan. 21, 2021, now Pat. No. 11,436,843.

(51) Int. Cl.
*G06V 20/56*    (2022.01)
*G06T 7/246*    (2017.01)
*G06T 7/73*     (2017.01)

(52) U.S. Cl.
CPC ............ *G06V 20/588* (2022.01); *G06T 7/246* (2017.01); *G06T 7/73* (2017.01); *G06T 2207/30256* (2013.01)

(58) Field of Classification Search
CPC .. G06V 20/588; G06K 9/00798; G06T 7/246; G06T 7/73; G06T 2207/30256
See application file for complete search history.

(56) References Cited

U.S. PATENT DOCUMENTS

| | | |
|---|---|---|
| 2012/0283912 A1 | 11/2012 | Lee et al. |
| 2016/0133131 A1 | 5/2016 | Grimm et al. |
| 2017/0010121 A1 | 1/2017 | Shashua et al. |
| 2018/0286051 A1 | 10/2018 | Suzuki et al. |
| 2019/0351901 A1 | 11/2019 | Hori |
| 2020/0285863 A1 | 9/2020 | Sadjadi et al. |
| 2021/0342603 A1 | 11/2021 | Hori |
| 2022/0230019 A1 | 7/2022 | Bande et al. |

FOREIGN PATENT DOCUMENTS

WO      2020240274 A1     12/2020

OTHER PUBLICATIONS

International Search Report and Written Opinion—PCT/US2021/072640—ISA/EPO—dated Mar. 21, 2022.

*Primary Examiner* — Carol Wang
(74) *Attorney, Agent, or Firm* — Weaver Austin Villeneuve & Sampson LLP/QUALCOMM

(57) ABSTRACT

A hybrid approach for using reference frames is presented in which a series of anchor frames is used, effectively resetting a global frame upon a trigger event. With each new anchor frame, parameter values for lane boundary estimates (known as lane boundary states) can be recalculated with respect to the new anchor frame. Triggering events may a based on a length of time, distance traveled, and/or an uncertainty value.

27 Claims, 10 Drawing Sheets

LANE MAPPING AND LOCALIZATION USING PERIODICALLY-UPDATED ANCHOR FRAMES

BACKGROUND

1. Field of Invention

The present invention relates generally to the field of electronic vehicle systems, and more specifically to Advanced Driver-Assist Systems (ADAS).

2. Description of Related Art

Vehicle systems, such as autonomous driving and ADAS, often need to track vehicle position and lane boundaries of a road on which the vehicle is traveling. To do so, ADAS systems may utilize information from a variety of sources. These sources may include, for example, a Global Navigation Satellite Systems (GNSS) receiver, inertial measurement unit (IMU), and one or more cameras. Vehicle position and lane boundaries can be tracked using a moving vehicle body reference frame ("body frame") or a static global reference frame ("global frame"). Both choices have their drawbacks.

BRIEF SUMMARY

Embodiments herein comprise a hybrid approach for using reference frames. In particular, embodiments use a series of anchor frames that effectively reset a global frame upon a trigger event. With each new anchor frame, parameter values for lane boundary estimates (known as lane boundary states) can be recalculated with respect to the new anchor frame. Triggering events may be based on a length of time, distance traveled, and/or an uncertainty value.

An example method of lane mapping and localization of a vehicle on a road, according to this disclosure, comprises determining, at a first time, a first set of parameter values descriptive of a lane boundary along a first portion of the road, where the first set of parameter values are determined with respect to a first frame of reference. The method also comprises subsequent to the first time, determining a position of the vehicle with respect to the first frame of reference. The method also comprises subsequent to determining the position of the vehicle, determining, at a second time, a second set of parameter values descriptive of the lane boundary along a second portion of the road, where: the second set of parameter values are determined with respect to an anchor frame may comprise a second frame of reference, and the second set of parameter values are determined in response to a trigger event.

An example mobile device, according to this disclosure, comprises sensors, a memory, and one or more processing units communicatively coupled with the sensors and the memory. The one or more processing units are configured to determine, at a first time, a first set of parameter values descriptive of a lane boundary along a first portion of a road on which a vehicle is located, where the first set of parameter values are determined with respect to a first frame of reference. The one or more processing units are also configured to subsequent to the first time, determine a position of the vehicle with respect to the first frame of reference. The one or more processing units are also configured to, subsequent to determining the position of the vehicle, determine, at a second time, a second set of parameter values descriptive of the lane boundary along a second portion of the road, where: the second set of parameter values are determined with respect to an anchor frame may comprise a second frame of reference, and the second set of parameter values are determined in response to a trigger event.

Another example device, according to this disclosure, comprises means for determining, at a first time, a first set of parameter values descriptive of a lane boundary along a first portion of a road on which a vehicle is located, where the first set of parameter values are determined with respect to a first frame of reference. The device also comprises means for determining, subsequent to the first time, a position of the vehicle with respect to the first frame of reference. The device also comprises means for determining, at a second time subsequent to determining the position of the vehicle, a second set of parameter values descriptive of the lane boundary along a second portion of the road, where: the second set of parameter values are determined with respect to an anchor frame may comprise a second frame of reference, and the second set of parameter values are determined in response to a trigger event.

An example non-transitory computer-readable medium, according to this disclosure, stores instructions for lane mapping and localization of a vehicle on a road. The instructions include code for determining, at a first time, a first set of parameter values descriptive of a lane boundary along a first portion of the road, where the first set of parameter values are determined with respect to a first frame of reference. The instructions also include code for, subsequent to the first time, determining a position of the vehicle with respect to the first frame of reference. The instructions also include code for, subsequent to determining the position of the vehicle, determining, at a second time, a second set of parameter values descriptive of the lane boundary along a second portion of the road, where: the second set of parameter values are determined with respect to an anchor frame may comprise a second frame of reference, and the second set of parameter values are determined in response to a trigger event.

BRIEF DESCRIPTION OF THE DRAWINGS

Aspects of the disclosure are illustrated by way of example.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

As used herein, the term "coordinates frame," "reference frame," "frame of reference," and the like refer to a coordinate frame with which locations of a vehicle and lane boundaries are tracked. Depending on desired functionality, the reference frame may comprise a 2-D coordinate frame (e.g., latitude and longitude on a 2-D map, etc.) or a 3-D coordinate frame (e.g., latitude, longitude, and altitude (LLA) on a 3-D map). Further, according to some embodiments, a position of the vehicle may include orientation information, such as heading. In some embodiments, a position estimate of the vehicle may include an estimate of six degrees of freedom (6DoF) (also known as "pose"), which includes translation (latitude, longitude, and altitude) and orientation (pitch, roll, and yaw) information.

Figure 1:
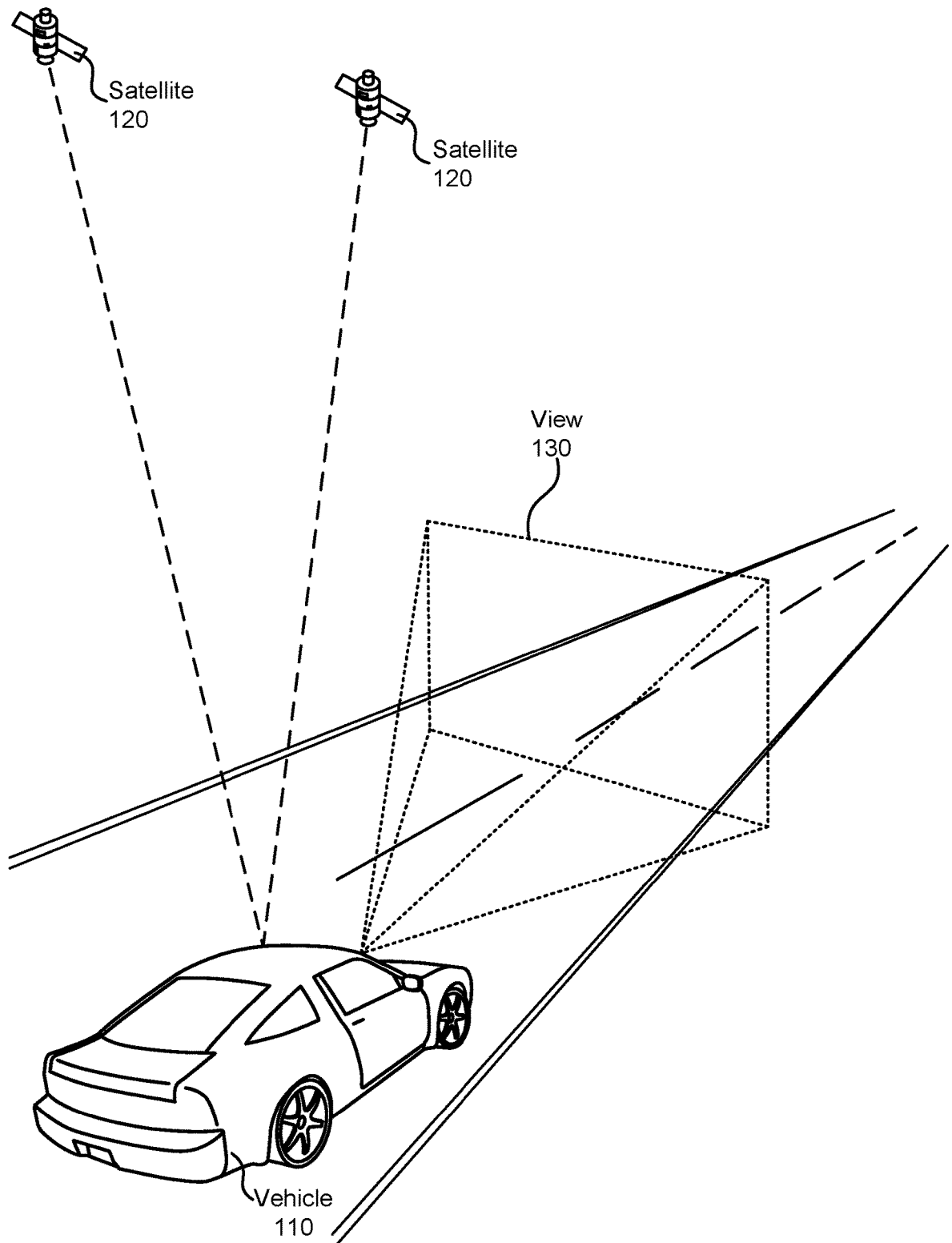
FIG. 1 is a drawing of a perspective view of a vehicle.

FIG. 1 is a simplified perspective view of a vehicle 110, illustrating an environment in which an ADAS system can be used by a vehicle 110. Satellites 120 may provide wireless (e.g., radio frequency (RF)) signals to a Global Navigation Satellite System (GNSS) receiver (e.g., a Global Positioning System (GPS) receiver) on the vehicle 110 for determination of the position (e.g., using absolute or global coordinates) of the vehicle 110. (Of course, although satellites 120 in FIG. 1 are illustrated as relatively close to the vehicle 110 for visual simplicity, it will be understood that satellites 120 will be in orbit around the earth.) The satellites 120 may be part of a one or more constellations of satellites of one or more GNSS systems.

Additionally, one or more cameras may capture images of the vehicle's surroundings. (E.g., a front-facing camera may take images (e.g., video) of a view 130 from the front of the vehicle 110.) Also one or more motion sensors (e.g., accelerometers, gyroscopes, etc.) on and/or in the vehicle 110 can provide motion data indicative of movement of the vehicle 110. Such sensors may be incorporated into inertial measurement unit (IMU). In some embodiments, the image and motion data can be fused to provide additional positioning information. This can then be used to complement and/or substitute (e.g., when needed) GNSS positioning of the vehicle 110, and/or help identify and track lane boundaries on a road along which the vehicle 110 is traveling.

The process of tracking lane boundaries, mapping newly-detected boundaries to these tracked lane boundaries, and positioning the vehicle with respect to the lane boundaries is referred to herein as lane mapping and localization. This can be a primary enabler for several ADAS functionalities for the vehicle 110, such as lane keeping and adaptive cruise control. Lane mapping and localization is often performed by a filter, such as an extended Kalman filter (EKF) or particle filter, that jointly tracks the lane boundaries and the vehicle position. An example system for performing lane mapping and localization is illustrated in FIG. 2.

Figure 2:
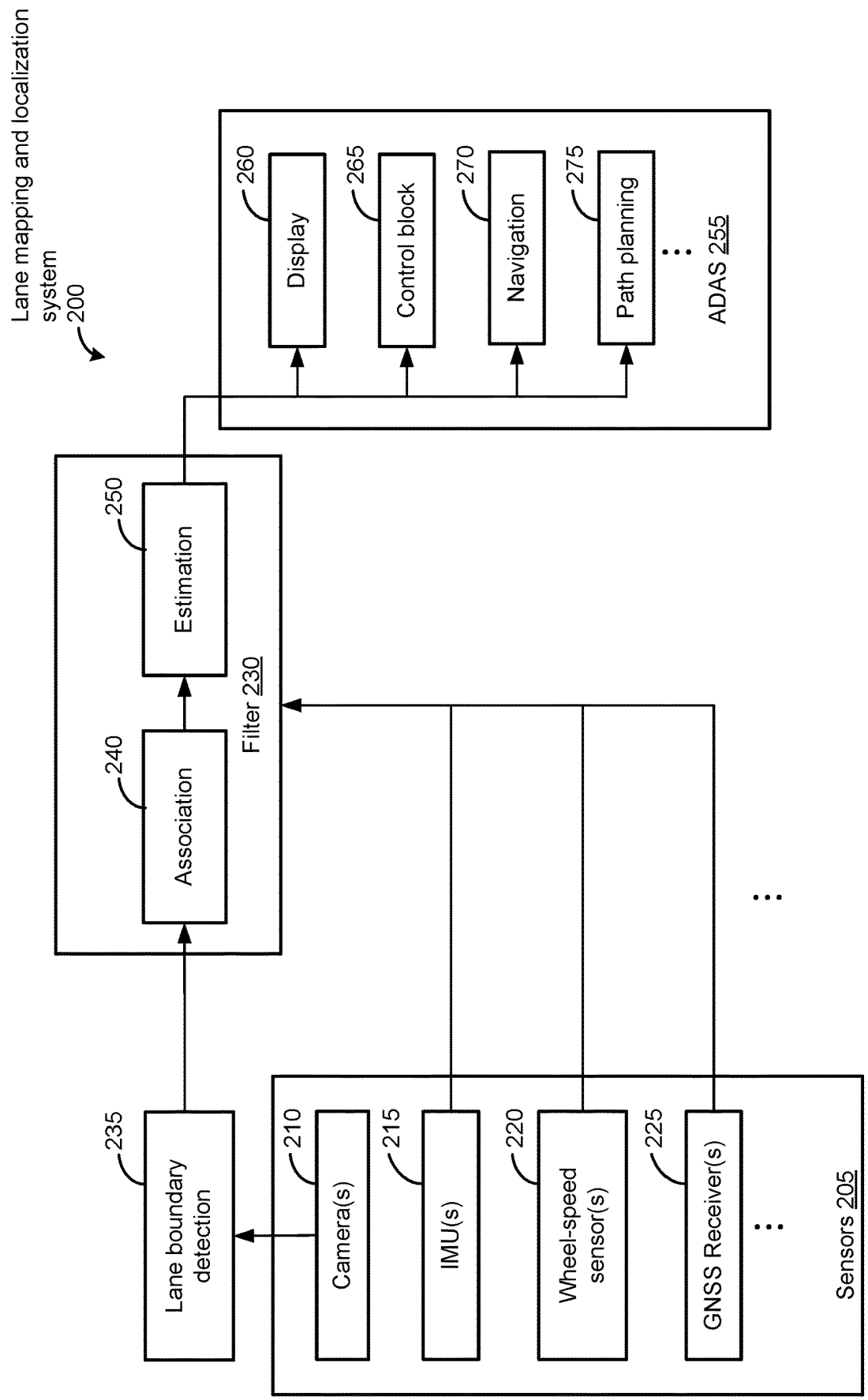
FIG. 2 is a block diagram of a lane mapping and localization system, according to an embodiment.

FIG. 2 is a block diagram of a lane mapping and localization system 200, according to an embodiment. This system 200 may be implemented by various components and systems within the vehicle 110 and may compose part of one or more additional vehicle systems (e.g., vehicle positioning, navigation, and/or automated driving systems, etc.). As with other embodiments herein, this figures provided only as an example and alternative embodiments may rearrange, add, omit, combine, separate, rearrange, and/or otherwise alter the illustrated components.

Here, vehicle sensors 205 may include one or more cameras 210, IMUs 215, wheel speed sensors 220, GNSS receivers 225, and/or other sensors capable of indicating vehicle movement and/or tracking lane boundaries on a road on which the vehicle 110 is traveling. The sensors 205 provide inputs to a filter which, as noted above, can perform the lane mapping and localization. To do so, input from one or more cameras 210 may first be provided to a lane boundary detection function 235, which may be executed by a processing unit and/or specialized circuitry. Using object detection, and/or similar algorithms on camera images, the lane boundary detection function 235 can identify candidate lane boundaries based on camera images from the camera(s) 210 and provide these candidate lane boundaries to the filter 230.

As noted, the filter 230 may comprise a Kalman filter (e.g., an EKF), particle filter, sliding-window algorithm, or similar filter or algorithm for state estimation, which may be executed (e.g., in software) by a processing unit and/or specialized circuitry. Using the association function 240, the filter 230 can associate the candidate lane boundaries in the input from the lane boundary detection function 235 with estimated lane boundaries currently being tracked. The estimation function 250 of the filter 230 can then update the tracked lane boundaries based on the association and update a position of the vehicle based on input from the sensors 205.

The results of this lane mapping and localization performed by the filter 230 can then be provided to any of a variety of systems within the vehicle 110, including ADAS systems 255. As illustrated, ADAS systems 255 may include, for example, a display 260, a control block 265, navigation block 270, path planning block 275, and/or other functions. The display 260 can, for example, display the positions of the vehicle 110 and/or lane boundaries, to a driver or other vehicle user. The control block 265 can, for example, control automated functions of the vehicle 110, such as lane keeping, adaptive cruise control, automated driving functionality, and/or other functions that may include vehicle-controlled breaking, acceleration, steering, etc. The navigation block 270 may comprise a device or system for providing navigation for the vehicle 110 that may use information regarding the location of the vehicle 110 and/or lane boundaries. The path planning block 275 may comprise a device or system for computing a target path for the vehicle based on a map and current vehicle position and then providing the target path to one or more vehicle control systems.

Figure 3A:
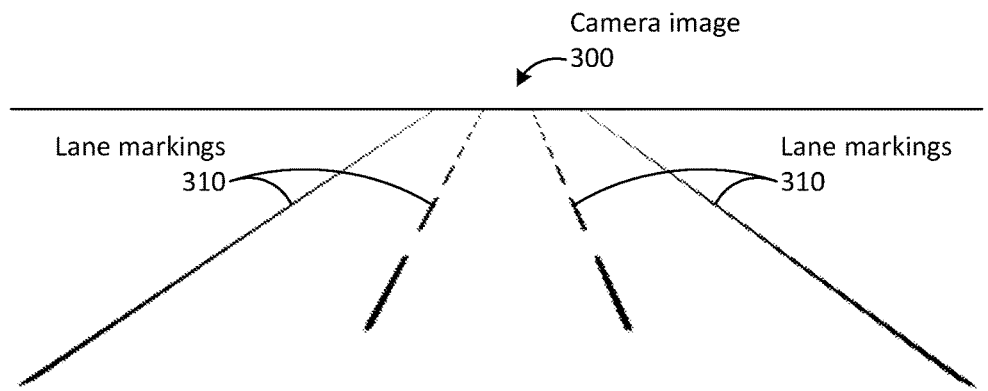
FIGS. 3A-3C diagrams illustrating a process of lane association, according to an embodiment.
Figure 3B:
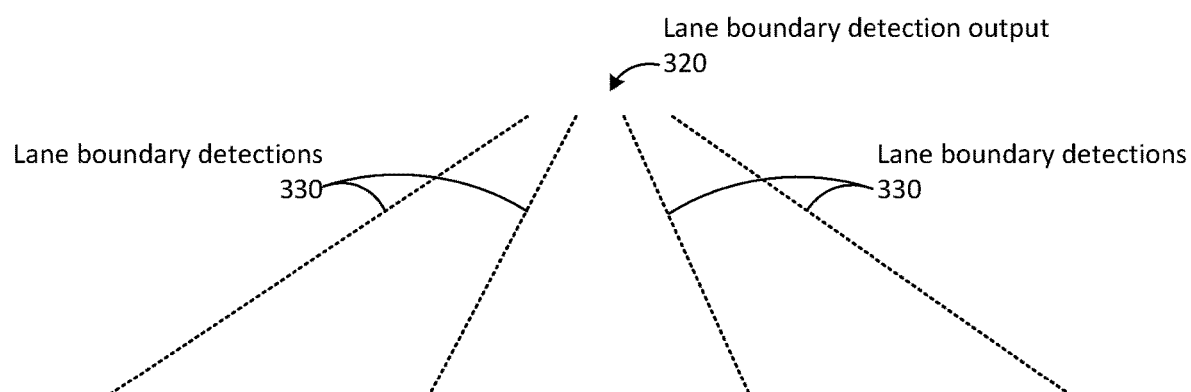
Figure 3C:
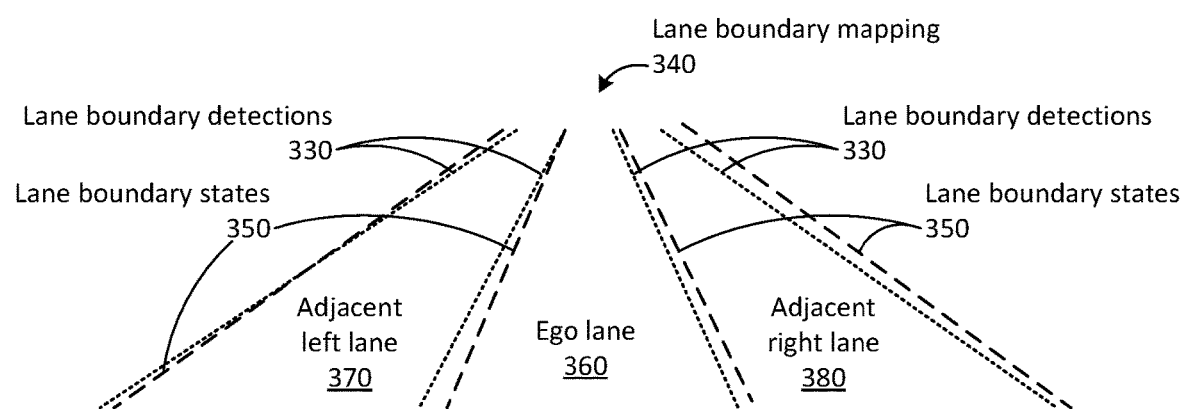

FIGS. 3A-3C are diagrams provided to help illustrate the process of lane association, according to an embodiment. As noted, this may be performed by an association function 240 of the filter 230 illustrated in FIG. 2.

FIG. 3A illustrates a camera image 300. The camera from which the image is obtained may comprise a camera 210 of the sensors 205 illustrated in FIG. 2 and may be a forward-facing camera of the vehicle 110 (e.g., having a view similar to the viewing 130 illustrated in FIG. 1). This can allow the camera to capture images of lane markings 310 indicating lane boundaries on a road along which the vehicle 110 is traveling. Depending on desired functionality, the vehicle camera may capture images or video several times per second (e.g., 30 frames per second (30 fps)). Lane boundary detection (e.g., at block 235 of FIG. 2) may be performed at a similar rate.

FIG. 3B illustrates a lane boundary detection output 320 based on the camera image 300 of FIG. 3A. As previously noted, lane boundary detection may use various identification and/or tracking algorithms to identify lane boundary detection 330 within the camera image 300. In some embodiments, lane boundary detection output 320 may comprise an identification for each lane boundary detection 330 (e.g., using a unique identifier such as a number or letter), along with pixels corresponding to each lane boundary detection 330, within the camera image 300.

Lane boundary detection 330 may not always accurately correspond with lane markings 310. In some instances, for example, lane markings 310 may be obscured by vehicles or other objects, snow, ice, etc. And therefore the lane boundary detection output 320 may not accurately identify certain lane markings 310. Moreover, in some instances, lane boundary detection may falsely identify other markings on the road (e.g., construction markings, tire skid tracks, etc.) as lane markings 310. As such, lane boundary detection 330 in the lane boundary detection output 320 may not ultimately be determined to correspond with actual lane boundaries. As such, lane boundary detection 330 are also referred to herein as candidate lane boundaries or lane boundary candidates.

FIG. 3C shows lane boundary mapping 340 in which lane boundary detections 330 are associated with (or mapped to) lane boundaries currently tracked in the filter and represented by lane boundary states 350 or filter states. This mapping may occur, as illustrated, in the image plane, based on the camera image 300 by projecting lane boundary states 350 onto the image plane (e.g., as shown in FIG. 3C) and comparing the projected lane boundary states to lane boundary detections 330. (Alternatively, lane boundary detections 330 may be projected onto another plane/coordinate system for association.) Broadly put, association occurs by matching lane boundary detections 330 with the most similar lane boundary states 350, based on factors such as distance, orientation, estimation uncertainty etc. Various algorithms may be used to perform this association.

Lane boundary states 350 may be maintained for lane boundaries of the "ego lane" 360 (in which the vehicle is located). When available, lane boundaries may also be maintained for lanes adjacent to the ego lane 360, such as adjacent left lane 370 (the lane immediately adjacent to the ego lane 360 on the left) and adjacent right lane 380 (the lane immediately adjacent to the ego lane 360 on the right). Tracking adjacent lanes can, for example, allow ADAS systems receiving lane boundary mapping 340 as input to determine whether a lane change as possible and (option-ally) perform the lane change maneuver. Additional lane boundaries from additional lanes may also be tracked and represented by lane boundary states 350, depending on functions such as desired functionality, number of lanes detected, processing capabilities, etc.

Within the filter, the lane boundary states 350 may describe lane boundaries using a parametric model. That is, each lane boundary state 350 may comprise a vector of values (e.g., scalar states) for one or more of scalar parameters representing curvature, heading, and/or other lane boundary features. The filter can then determine the parameter values that allow the lane boundary state 350 to accurately represent the corresponding lane boundary. (Hence, lane boundary states 350 are also referred to herein as lane boundary estimates.)

Figure 4A:
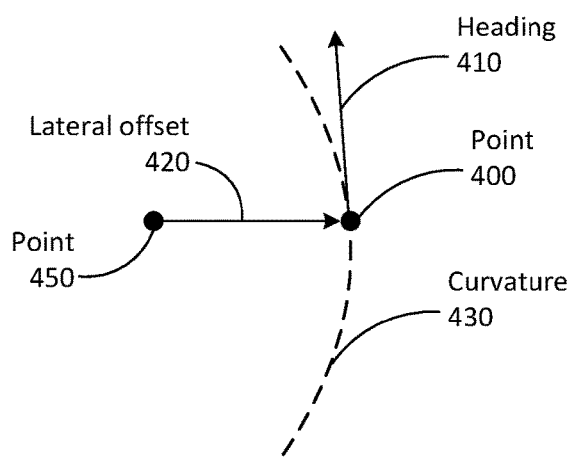
FIGS. 4A and 4B are diagrams illustrating how lane boundary states may be represented in a filter, according to an embodiment.

An example of parameters used in lane boundary states 350 is illustrated in FIG. 4A. Here, for a representative point 400 on a lane boundary, parameters may include a lane boundary heading 410, lateral offset 420, and curvature 430 descriptive of the lane boundary. According to some embodiments, parameters may include coordinates for the point 400 itself. Additional or alternative parameters may be used by a lane boundary state 350 estimate a lane boundary. As noted, parameters may be described in relation to the vehicle frame, which may be centered, for example, at point 450.

Figure 4B:
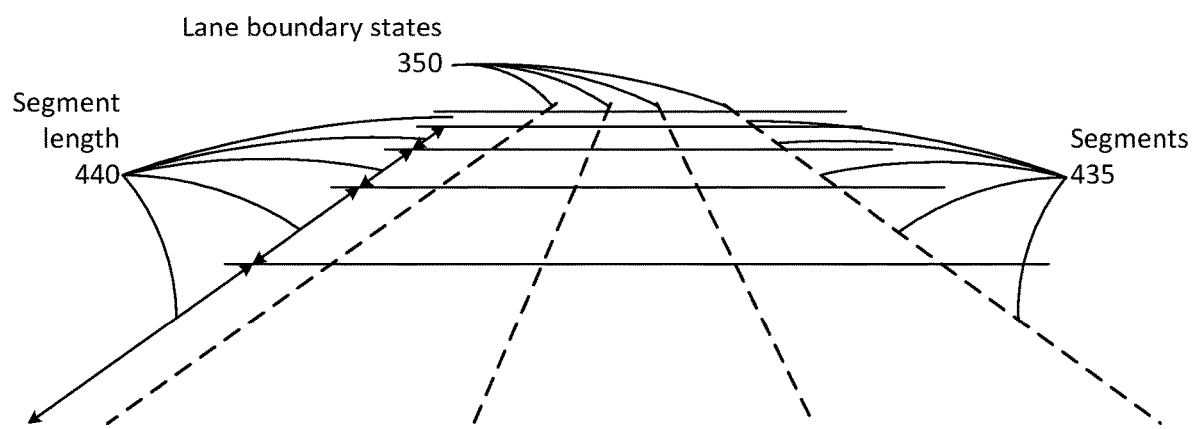

According to some embodiments, lane boundary states 350 may be segmented as illustrated in FIG. 4B to describe an upcoming section of road. (To avoid clutter, segments 435 from only one lane boundary state 350 are labeled.) Each lane boundary segment may have a unique set of parameter values, allowing each segment 435 to be modeled differently by the lane boundary state 350. The number of segments and the segment length 440 may vary, depending on desired functionality, to balance accuracy of the lane boundary states 350 (which may increase with a larger number of segments) with associated processing requirements (which also may increase with a larger number of segments).

This may result in a large amount of parameter values to track. For example, an embodiment may maintain lane boundary states 350 representing lane boundaries along 75 m of road in front of the vehicle 110, where each lane boundary is segmented into segments having a segment length 440 of 15 m. This results in five segments for each lane boundary state 350. If four lane boundary states 350 are maintained by the filter 230 (e.g., lane boundary states 350 for the ego lane 360, adjacent left lane 370, and adjacent right lane 380), this results in 20 segments for the filter to track. And if each segment is represented by three parameter values (e.g., values for lateral offset, heading, and curvature), this results in 60 parameter values for the filter 230 to determine in order to track the lane boundaries corresponding to the four lane boundary states 350.

The way in which the filter 230 tracks parameter values can be greatly impacted by the frame of reference used by the filter to express these parameter values. Commonly-used frames of reference include a moving vehicle body reference frame ("body frame") or a static global reference frame ("global frame" or "static frame").

Figure 5:
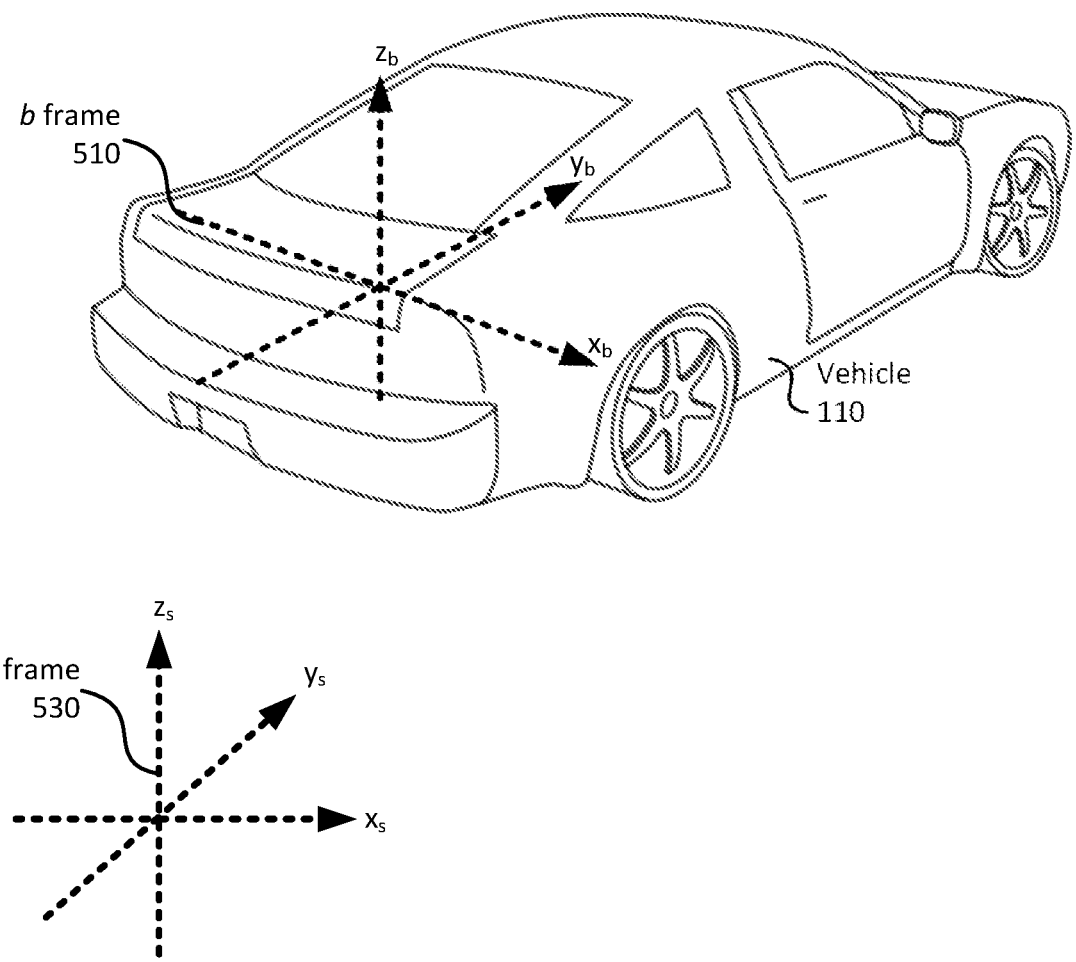
FIG. 5 is a perspective view of a vehicle, illustrating reference frames that can be used, according to an embodiment.

FIG. 5 is an illustration of various coordinate frames with respect to a vehicle 110. In particular, the body frame ("b frame") 510 comprises a coordinate frame of a fixed position on the body of the vehicle 110. This may comprise, for example, a predetermined location on the vehicle 110 (e.g., a location on the rear axle of the vehicle), a location of an IMU 215 or another sensor of the vehicle 110, or the like.

According to some embodiments, the location on the vehicle may be vehicle dependent. The global frame ("s frame") 530 comprises a spatial coordinate frame which represents a coordinate frame outside the vehicle 110. The global flame 530 may be independent of the vehicle 110 (e.g., a coordinate system relative to the earth) and which may be the coordinate system used by the GNSS receiver(s) 225. Alternatively, the global frame 530 may comprise some other static location outside the vehicle 110, such as a point of origin of the vehicle 110 when initially turned on, prior to moving.

As noted, the use of a body frame 510 or global frame 530 can greatly impact the functionality of the filter 230. For example, if the body frame 510 is used as the reference frame for the filter 230, the lane boundary states 350 can have complicated dynamics, which may need to be linearized by the filter (e.g., in an EKF). When receiving input from sensors 205, the filter 230 may need to adjust parameter values for lane boundary states 350 to reflect a new position of the vehicle 110 (and body frame 510) on the road. In the previous example with 60 parameter values, therefore, all 60 parameter values may need to be updated. Furthermore, in the case where measurements are received at a high frequency (e.g., IMU measurements received at 200 Hz), the filter 230 may determine parameter values at the same (or a similar) high frequency. The frequency and complexity of the determination of parameter values when using the body frame 510 can be computationally expensive and can preclude real-time operation. Further, because use of the body frame 510 can require linearization of the dynamics, it may also introduce significant linearization error, which can impact the filter accuracy. These issues degrade the lane mapping performance.

On the other hand, if the global frame 530 is used as the reference frame, the lane boundary states have no dynamics because they do not change in reference to the global frame of 530. However, in this case, potentially unbounded drift can occur between the calculated vehicle position with respect to this global frame, which can impact the accuracy of the filter 230. In other words, this unbounded drift degrades the localization performance. An example of this is illustrated in FIG. 6.

Figure 6:
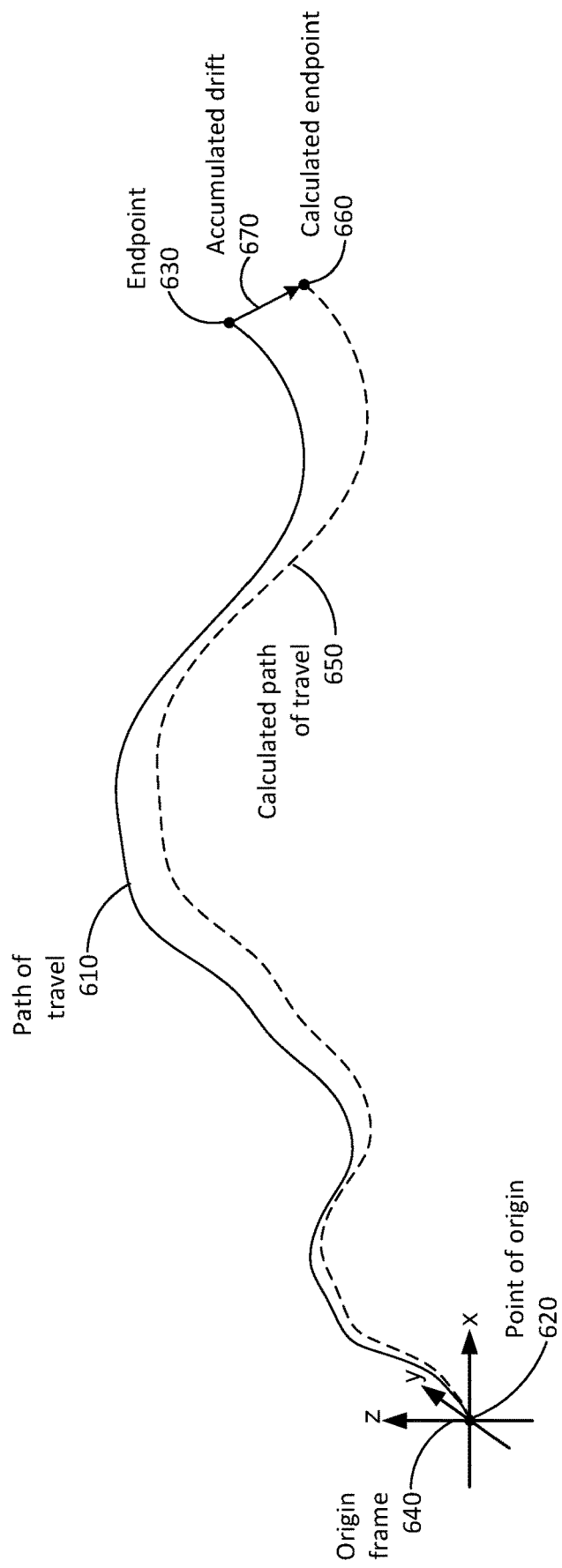
FIG. 6 is a simplified graph illustrating an example of a vehicle's path of travel from a point of origin to an endpoint using a single origin frame.

FIG. 6 is a simplified graph illustrating a vehicle's path of travel 610 from a point of origin 620 to an endpoint 630 with respect to origin frame 640. Here, the point of origin 620 may comprise a location of the vehicle 110 when first turned on, prior to movement. Origin frame 640 is a global frame centered at the point of origin 620 that can be initiated when the car is first turned on and used as a reference frame for localization of the vehicle 110.

As the vehicle moves along the path of travel 610, the calculated location of the vehicle 110 can drift with respect to the origin frame 640. Due to errors and/or inaccuracies in the calculated location of the vehicle 110 based on sensor input, this drift is unbounded, generally increasing with increased distance from the origin frame 640. As illustrated in FIG. 6, for example, the calculated path of travel 650 (in terms of the origin frame 640) differs from the path of travel 610 such that the calculated endpoint 660 differs from the actual endpoint 630 by an accumulated drift 670.

Figure 7:
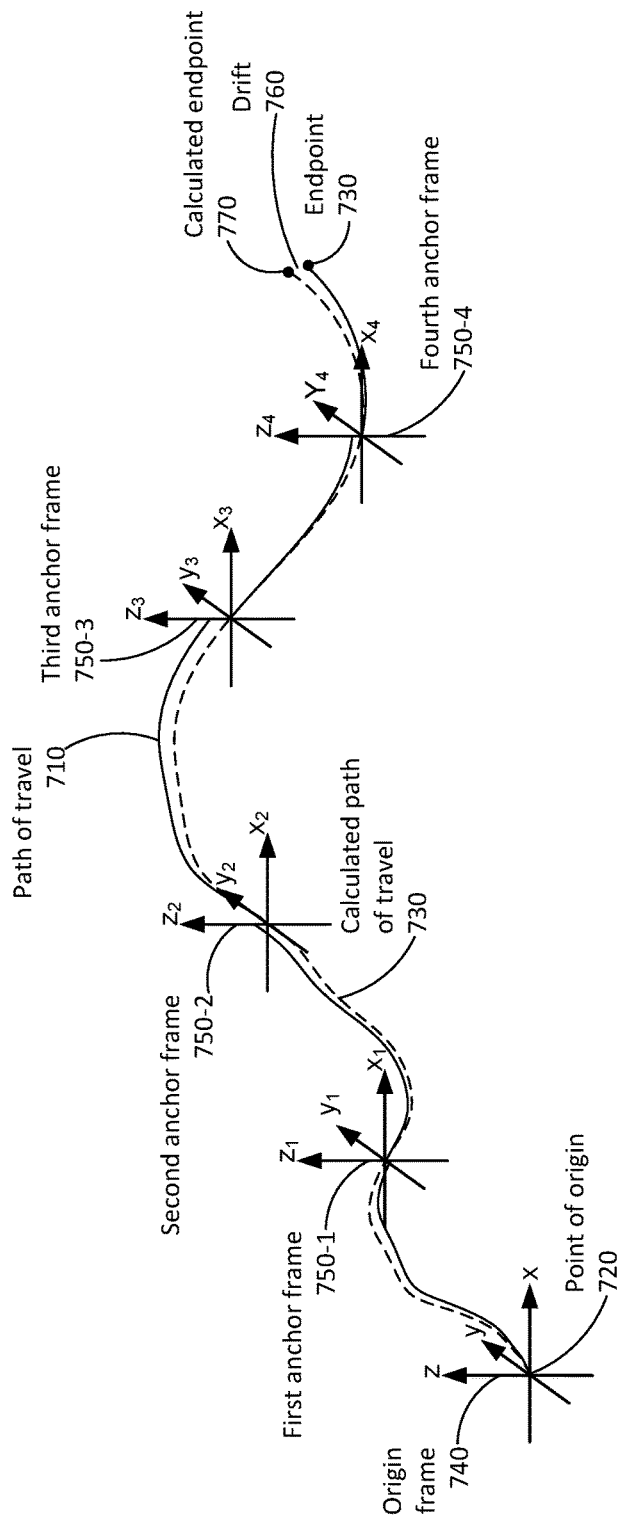
FIG. 7 is a simplified graph illustrating an example of a vehicle's path of travel, similar to FIG. 6, but using several anchor frames.

Embodiments herein address the issues of unbounded drift when using a global frame 530 (e.g. origin frame 640) and computational complexity when using body frame 510 by using a hybrid approach. In particular, rather than using a single global frame 530, embodiments use a series of "anchor frames" used to periodically reset the global frame 530 to the body frame 510 based on a trigger event. This can offer significant computational savings over the use of a body frame 510 in the filter 230, while also keeping drift bounded. FIG. 7 illustrates an example.

FIG. 7 is a simplified graph, similar to FIG. 6, illustrating a vehicle's path of travel 710 from a point of origin 720 to an endpoint 730. Again, an origin frame 740 may be centered at the point of origin 720 and used as an initial static reference frame to describe the vehicle's position as the vehicle travels along the path of travel 710. Here, however, the reference frame is subject to many "re-anchorings" in which static anchor frames 750 are periodically used (beginning with first anchor frame 750-1, followed by a second anchor frame 750-2, and so on) as the vehicle travels from the point of origin 720 the endpoint 730. For each anchor frame 750, once the anchor frame 750 is used, the path of travel 710 is described with respect to that anchor frame 750 until a subsequent anchor frame 710 is used.

With every new anchor frame 750, parameter values for lane boundary filter states can be recalculated to be expressed in the new anchor frame 750. The location of the new anchor frame 750 may comprise a location of a body frame 510 of the vehicle 110 at the time of re-anchoring. By using anchor frames 750 in this manner, drift accumulation is effectively bounded with respect to each anchor frame 750, resetting with each subsequent anchor frame 750. This property is useful since the filter is tracking with respect to the current anchor frame. Furthermore, because the parameter values may only need to be recomputed once for each anchor frame 750, the computational requirements of this method can be far less than those that constantly recalculate parameter values using body frame 510 as the vehicle 110 moves (recalculating parameter values, for example, every few seconds rather than every few milliseconds). It further reduces the linearization error of such methods.

Depending on desired functionality, trigger events that cause re-anchoring may vary. For example, according to some embodiments, a trigger may comprise any combination of a length of time since a previous frame was created (e.g., an origin frame 740 or previous anchor frame 750), a threshold distance traveled since the previous frame was created, an uncertainty value (e.g., a position estimate variance as computed by the filter) exceeding a threshold, and so on. Thresholds for these triggers (e.g., threshold uncertainty values, time lengths, distances) may be selected to balance accuracy requirements, processing capabilities, and other such factors. Because these factors may vary, these thresholds may be dynamic and may vary from one travel route to the next, or even within a single travel route.

It can be noted that, for lane boundary states 350 modeled as 3D objects, the computation of corresponding parameter values during re-anchoring may be standard. With 2D-modeled lane boundary states 350, however, additional operations may be performed to help ensure accuracy. A description of how this can be done is provided with regard to FIGS. 8A and 8B.

Figure 8A:
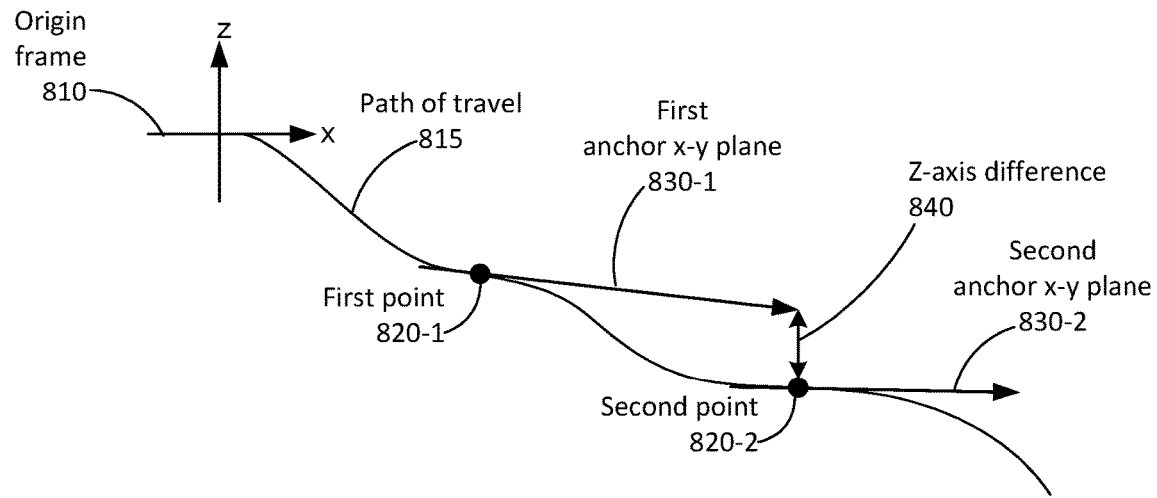
FIGS. 8A-8B are diagrams illustrating a process by which consistency of lane boundary states between successive anchor frames can be ensured, according to an embodiment.
Figure 8B:
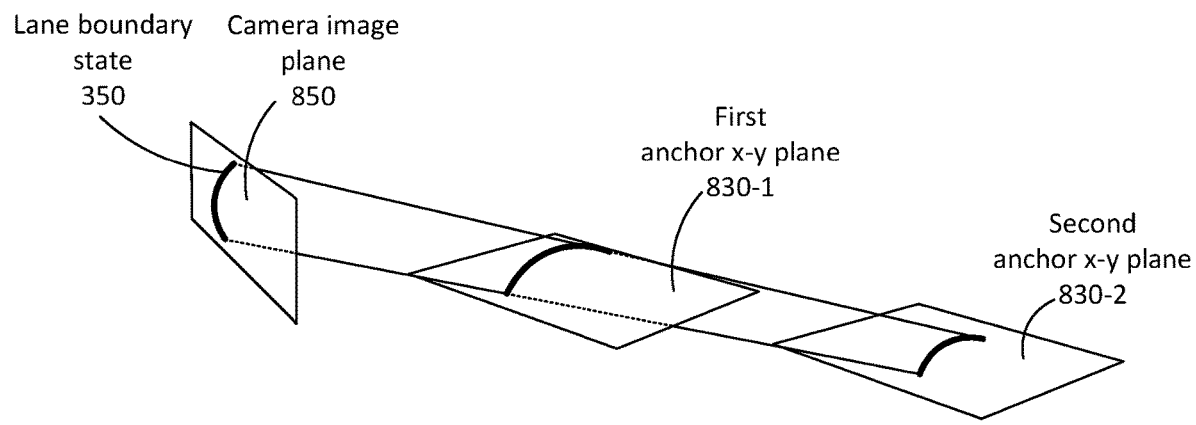

FIG. 8A is a simplified cross-sectional diagram illustrating changes in elevation (e.g., along the z axis) and slope of a vehicle's path of travel 815, according to an example. Here, anchor frames (not shown) may be used at a first point 820-1 and a second point 820-2, where each anchor frame as a corresponding anchor x-y plane 830 tangent to the road at the corresponding point 820. For lane mapping and localization systems 200, particularly for single-camera systems, the lane boundary states 350 (not shown) may be modeled as 2D objects, which may occur on these x-y planes 830. However, inconsistencies in the lane boundary states 350 (e.g., large camera reprojection errors of the lane boundary states 350 which can result in filter divergence) may occur when there is a change in road elevation or slope between anchor frames resulting in a z-axis or a slope difference these x-y planes 830, such as the z-axis difference 840 between first anchor x-y plane 830-1 and second anchor x-y plane 830-2.

To help ensure consistency in lane boundary states 350 from one anchor frame to the next for 2D-modeled lane boundary states 350, embodiments can use a projection of these lane boundary states 350 onto a camera image plane 850 of the camera (e.g. the camera capturing camera image 300 of FIG. 3A). An example of this is provided in the illustration shown in FIG. 8B. In particular, a lane boundary state 350 modeled in a first anchor x-y plane 830-1 may be recalculated in a second anchor x-y plane 830-2 such that the projection of the lane boundary state 350 from the first and the second anchor x-y planes 830-1 and 830-2 onto the camera image plane 850 stays invariant. In one embodiment, this recalculation can be performed by a perspective mapping from the first anchor x-y plane onto the camera image plane followed by an inverse perspective mapping from the camera image plane onto the second anchor x-y plane. This can help ensure consistency of the lane boundary states 350 across multiple anchor frames.

Figure 9:
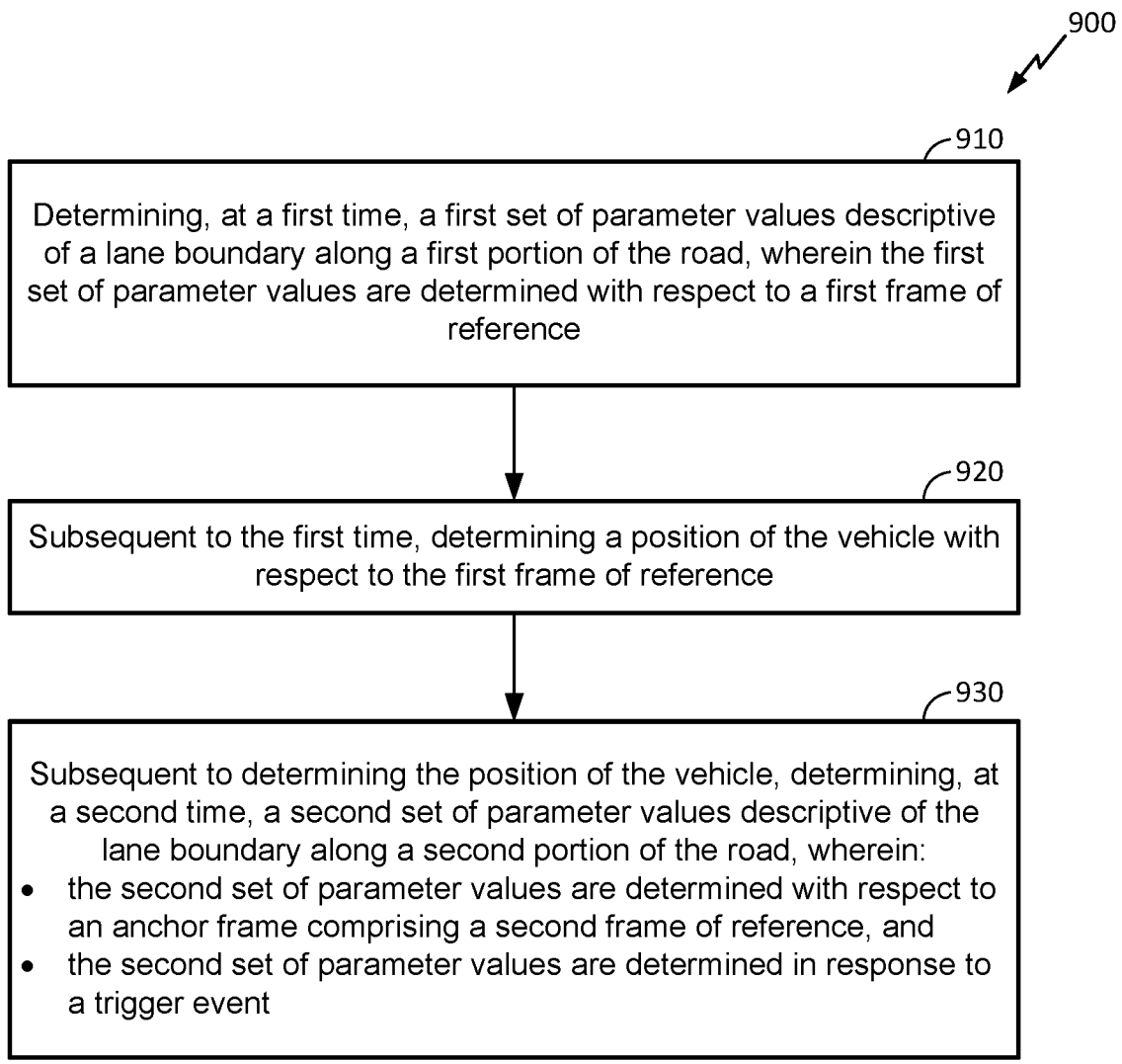
FIG. 9 is a flow diagram of a method of lane mapping and localization of a vehicle on a road, according to embodiment.

FIG. 9 is a flow diagram of a method 900 of lane mapping and localization of a vehicle on a road, according to an embodiment. Alternative embodiments may perform functions in alternative order, combine, separate, and/or rearrange the functions illustrated in the blocks of FIG. 9, and/or perform functions in parallel, depending on desired functionality. A person of ordinary skill in the art will appreciate such variations. Means for performing the functionality of one or more blocks illustrated in FIG. 9 can include, for example, a filter 230. As noted, the filter 230 may comprise a Kalman filter (e.g., EKF), particle filter, or similar algorithms configured to recursively update state estimates (e.g., lane boundary states 350) from a sequence of updated data from one or more sensors 205. The filter 230 may be implemented in software and executed by a processing unit and/or other hardware and/or software components of an on-vehicle computer system, such as the mobile computing system 1000 of FIG. 10, described in further detail below. Additionally or alternatively, such means may include specialized hardware.

Figure 10:
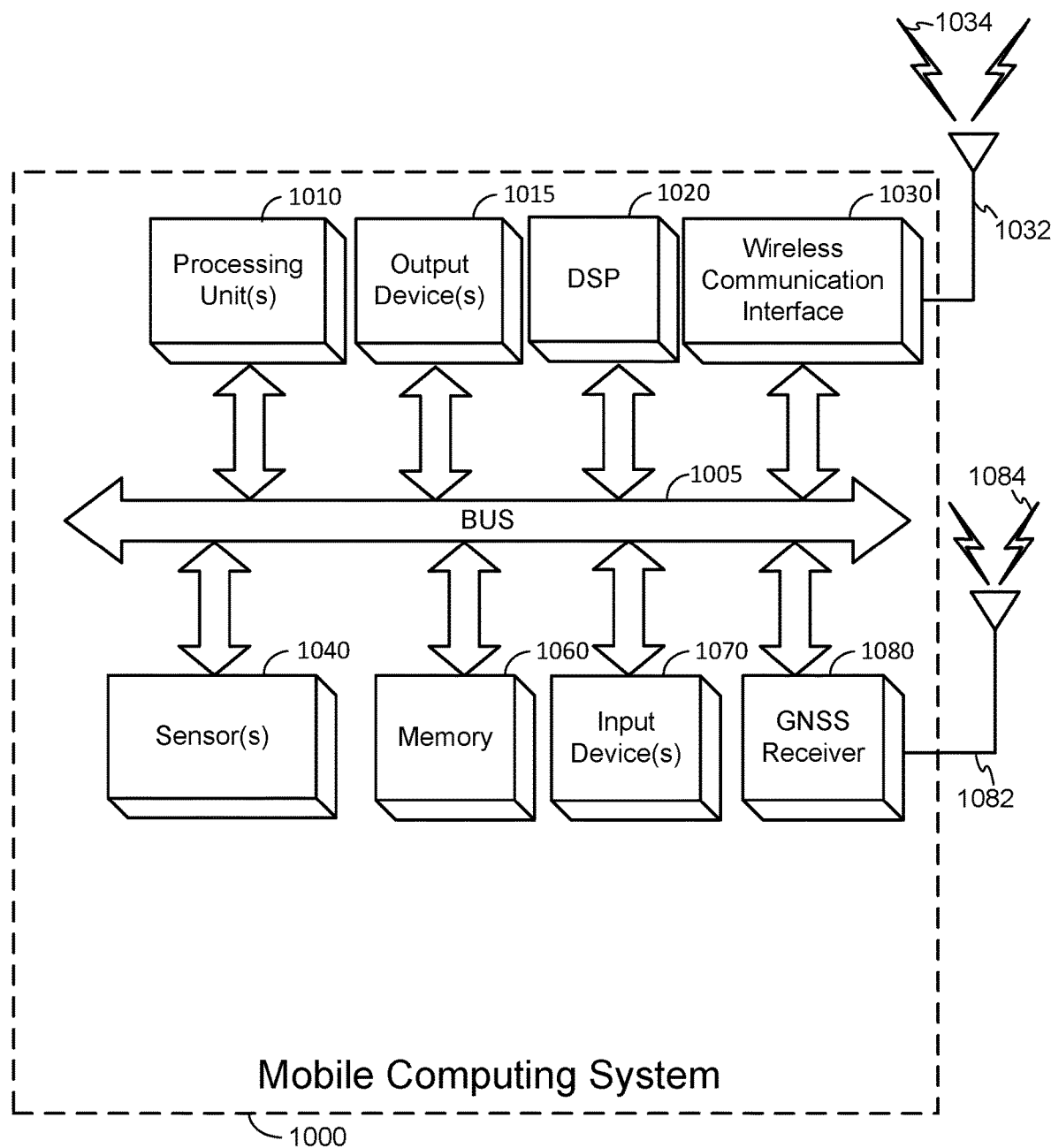
FIG. 10 is a block diagram of an embodiment of a mobile computing system.

At block 910, the functionality comprises determining, at a first time, a first set of parameter values descriptive of a lane boundary along a first portion of the road, wherein the first set of parameter values are determined with respect to a first frame of reference. As previously indicated, lane boundary states may comprise a set of parameter values (e.g., scalar states) descriptive of a lane boundary, which may be calculated and maintained by a filter, and updated by sensor input. Additionally or alternatively parameter values may be based on input from a map and/or other relevant non-sensor information regarding lane boundaries. The first frame of reference may comprise and origin frame 740 or anchor frame 750, for example, as illustrated in FIG. 7. As such, the first frame of reference may comprise a frame of reference based on a location of the vehicle (or more specifically, a body frame of the vehicle) at a previous point in time. Means for performing the functionality of block 910 may include a bus 1005, processing unit(s) 1010, Digital Signal Processor (DSP) 1020, input device(s) 1070, working memory 1035, and/or other components of a mobile computing system 1000 as illustrated in FIG. 10 and described in further detail below.

The functionality at block 920 comprises, subsequent to the first time, determining a position of the vehicle with respect to the first frame of reference. As noted in the process illustrated in FIG. 7, this may be based on sensor input, and may require much less processing power than re-calculating parameter values with respect to a body frame as a vehicle moves. According to some embodiments, the determining of the position of the vehicle can comprise obtaining sensor information, indicative of movement of the vehicle along the road and using the sensor information to determine the position of the vehicle. This can include a variety of sensors 205, as indicated in FIG. 2 and previously described. Accordingly, according to some embodiments, the sensor information may comprise movement information from an IMU sensor located on the vehicle, a wheel-speed sensor located on the vehicle, wireless signal measurements, a GNSS sensor located on the vehicle, or a camera sensor located on the vehicle, or any combination thereof. Wireless signal measurements may comprise measurements of wireless signals transmitted by a cellular, wide-area, and/or local area network, which may be used for positioning and/or motion tracking of the vehicle. Means for performing the functionality of block 920 may include a bus 1005, processing unit(s) 1010, Digital Signal Processor (DSP) 1020, input device(s) 1070, working memory 1035, and/or other components of a mobile computing system 1000 as illustrated in FIG. 10 and described in further detail below.

The functionality at block 930 comprises, subsequent to determining the position of the vehicle, determining, at a second time, a second set of parameter values descriptive of the lane boundary along a second portion of the road, where the second set of parameter values are determined with respect to an anchor frame comprising a second frame of reference, and the second set of parameter values are determined in response to a trigger event. In some instances, the first portion of the road may at least partially overlap with the second portion of the road. As noted, the use of an anchor frame can be based on time, distance, and/or uncertainty. As such, according to some embodiments, the trigger event comprises a length of time having elapsed since the first time, a distance travelled by the vehicle since the first time, an uncertainty value having grown since the first time, or any combination thereof. As previously indicated, lane boundary states 350 may include different types of parameters to describe lane boundaries. According to some embodiments, the first set of parameter values and the second set of parameter values include values for parameters comprising a heading of the lane boundary, a curvature of the lane boundary, an offset of the lane boundary, or a point on the lane boundary, or any combination thereof.

Other embodiments may include additional functionality. And as noted, one lane boundary states are represented in two dimensions, and image plane can be used to help ensure consistency from one frame of reference to the next. Thus, according to some embodiments, the first set of parameter values and the second set of parameter values are descriptive of the lane boundary in two dimensions such that a projection of the lane boundary from a plane of the first anchor frame onto an image plane of a camera located on the vehicle overlaps with a projection of the lane boundary from a plane of the second anchor frame onto the image plane. Additionally, a filter may provide the determined information to any of a variety of output systems. Some embodiments of the method 900, therefore, may further comprise providing the determined position or the determined lane boundary. Providing the determined position or lane boundary comprises providing them to an Advanced Driver-Assist System (ADAS) of the vehicle, or a user interface of the vehicle, or both.

Means for performing the functionality of block 930 may include a bus 1005, processing unit(s) 1010, Digital Signal Processor (DSP) 1020, input device(s) 1070, working memory 1035, and/or other components of a mobile computing system 1000 as illustrated in FIG. 10 and described in further detail below.

FIG. 10 is a block diagram of an embodiment of a mobile computing system 1000, which may be used to perform some or all of the functionality described in the embodiments herein, including the functionality of one or more of the blocks illustrated in FIG. 7. The mobile computing system 1000 may be located on a vehicle and may include some or all of the components of the lane mapping and localization system 200 of FIG. 2. For example, the filtered 230 and lane boundary detection function 235 of FIG. 2 may be executed by processing unit(s) 1010 and/or DSP 1020; any or all of the sensors 205 may correspond with sensor(s) 1040, GNSS receiver 1080, and/or input device(s) 1070; ADAS 255 may be implemented by processing unit(s) 1010 and/or DSP 1020, or may be included in the output device(s) 1015; and so forth. A person of ordinary skill in the art will appreciate where additional or alternative components of FIG. 2 and FIG. 10 may overlap.

It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical locations on a vehicle.

The mobile computing system 1000 is shown comprising hardware elements that can be electronically/communicatively coupled via a bus 1005 (or may otherwise be in communication, as appropriate). The hardware elements may include processing unit(s) 1010, which can include without limitation one or more general-purpose processors, one or more special-purpose processors (such as a digital signal processor (DSP), graphical processing unit (GPU), application specific integrated circuit (ASIC), field-programmable gate array (FPGA), and/or the like), and/or other processing structure or means, which can be configured to perform one or more of the methods described herein, including at least a portion of the method described in FIG. 9. The mobile computing system 1000 also can include one or more input devices 1070, which can include without limitation a CAN bus (and/or another source of data for various vehicle systems), vehicle feedback systems, user input (e.g., a touchscreen display, breaking input, steering input, dials, switches, etc.), and/or the like. The mobile computing system 1000 can also include one or more output devices 1015, which can include without limitation a display device (e.g., e.g., dash display, infotainment screen, etc.), lights, meters, vehicle automation and/or control systems, and/or the like.

The mobile computing system 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile computing system 1000 to communicate with other devices as described in the embodiments above. The wireless communication interface 1030 may permit data and signaling to be communicated (e.g., transmitted and received) with transmission/reception points (TRPs) of a network, for example, via access points, various base stations, and/or other access node types, and/or other network components, computer systems, and/or any other electronic devices communicatively coupled with TRPs, as described herein.

Communication may be carried out via an applicable communication standard for vehicular commute occasion, such as Vehicle-to-everything (V2X). V2X can include vehicle-to-vehicle (V2V) communication between V2X-capable vehicles, vehicle-to-infrastructure (V2I) communication between the vehicle and infrastructure-based devices (commonly termed roadside units, or roadside units (RSUs)), vehicle-to-person (V2P) communication between vehicles and nearby people (pedestrians, cyclists, and other road users), and the like. Further, V2X can use any of a variety of wireless radio frequency communication technologies. Cellular V2X (CV2X), for example, is a form of V2X that uses cellular-based communication such as long-term evolution (LTE), fifth-generation new radio (5G NR), and/or other cellular technologies in a direct-communication mode as defined by the 3rd Generation Partnership Project (3GPP). In this way, the mobile computing system 1000 may comprise a V2X device or V2X user equipment (UE).

The communication by the wireless communication interface 1030 can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations and other terrestrial transceivers, such as wireless devices and access points. The mobile computing system 1000 may communicate with different data networks that may comprise various network types. For example, a Wireless Wide Area Network (WWAN) may be a Code-division multiple access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, wideband CDMA (WCDMA), and so on. CDMA2000 includes IS-95, IS-2000 and/or IS-856 standards. A TDMA network may implement Global System for Mobile Communications (GSM), Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computing system 1000 can further include sensor(s) 1040. As previously noted, sensors may include any of the vehicle sensors described herein, including sensors 205 illustrated in FIG. 2 and previously described. Additionally or alternatively, sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile computing system 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the mobile computing system 1000, using conventional techniques, from GNSS satellites 120 of a GNSS system, such as GPS, Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an EKF, Weighted Least Squares (WLS), a hatch filter, particle filter, or the like. The positioning engine may also be executed by one or more processing units, such as processing unit(s) 1010 or DSP 1020.

The mobile computing system 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the mobile computing system 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the mobile computing system 1000 (and/or processing unit(s) 1010 or DSP 1020 within mobile computing system 1000). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of lane mapping and localization of a vehicle on a road, the method comprising: determining, at a first time, a first set of parameter values descriptive of a lane boundary along a first portion of the road, wherein the first set of parameter values are determined with respect to a first frame of reference; subsequent to the first time, determining a position of the vehicle with respect to the first frame of reference; and subsequent to determining the position of the vehicle, determining, at a second time, a second set of parameter values descriptive of the lane boundary along a second portion of the road, wherein: the second set of parameter values are determined with respect to an anchor frame comprising a second frame of reference, and the second set of parameter values are determined in response to a trigger event.

Clause 2: The method of clause 1, wherein the trigger event comprises: a length of time having elapsed since the first time, a distance travelled by the vehicle since the first time, or an uncertainty value having grown since the first time, or any combination thereof.

Clause 3: The method of clause 1 or 2, further comprising providing output information comprising information indicative of the determined position of the vehicle, the second set of parameter values descriptive of the lane boundary, or both.

Clause 4: The method of any of clauses 1-3, wherein providing the output information comprises providing the output information to: an Advanced Driver-Assist System (ADAS) of the vehicle, or a user interface of the vehicle, or both.

Clause 5: The method of any of clauses 1-4, wherein the first portion of the road at least partially overlaps with the second portion of the road.

Clause 6: The method of any of clauses 1-5, wherein the first set of parameter values and the second set of parameter values include values for parameters comprising: a heading of the lane boundary, a curvature of the lane boundary, an offset of the lane boundary, or a point on the lane boundary, or any combination thereof.

Clause 7: The method of any of clauses 1-6, wherein the determining of the position of the vehicle comprises: obtaining sensor information, indicative of movement of the vehicle along the road, and using the sensor information to determine the position of the vehicle.

Clause 8: The method of any of clauses 1-7, wherein the sensor information comprises movement information from: an Inertial Measurement Unit (IMU) sensor located on the vehicle, a wheel-speed sensor located on the vehicle, wireless signal measurements, a GNSS sensor located on the vehicle, or a camera sensor located on the vehicle, or any combination thereof.

Clause 9: The method of any of clauses 1-8, wherein the first set of parameter values and the second set of parameter values are descriptive of the lane boundary in two dimensions such that a projection of the lane boundary from a plane of the anchor frame onto an image plane of a camera located on the vehicle overlaps with a projection of the lane boundary from a plane of the anchor frame onto the image plane.

Clause 10: A mobile device comprising: sensors; a memory; and one or more processing units communicatively coupled with the sensors and the memory, the one or more processing units configured to: determine, at a first time, a first set of parameter values descriptive of a lane boundary along a first portion of a road on which a vehicle is located, wherein the first set of parameter values are determined with respect to a first frame of reference; subsequent to the first time, determine a position of the vehicle with respect to the first frame of reference; and subsequent to determining the position of the vehicle, determine, at a second time, a second set of parameter values descriptive of the lane boundary along a second portion of the road, wherein: the second set of parameter values are determined with respect to an anchor frame comprising a second frame of reference, and the second set of parameter values are determined in response to a trigger event.

Clause 11: The mobile device of clause 10, wherein the one or more processing units are further configured to detect the trigger event, wherein the trigger event comprises: a length of time having elapsed since the first time, a distance travelled by the vehicle since the first time, or an uncertainty value having grown since the first time, or any combination thereof.

Clause 12: The mobile device of clause 10 or 11, wherein the one or more processing units are further configured to provide output information, the output information indicative of the determined position of the vehicle, the second set of parameter values descriptive of the lane boundary, or both.

Clause 13: The mobile device of any of clauses 10-12, wherein the one or more processing units are configured to provide the output information to: an Advanced Driver-Assist System (ADAS) of the vehicle, or a user interface of the vehicle, or both.

Clause 14: The mobile device of any of clauses 10-13, wherein the first portion of the road at least partially overlaps with the second portion of the road.

Clause 15: The mobile device of any of clauses 10-14, wherein the first set of parameter values and the second set of parameter values include values for parameters comprising: a heading of the lane boundary, a curvature of the lane boundary, an offset of the lane boundary, or a point on the lane boundary, or any combination thereof.

Clause 16: The mobile device of any of clauses 10-15, wherein, to determine of the position of the vehicle, the one or more processing units are configured to: obtain sensor information from the sensors, the sensor information indicative of movement of the vehicle along the road, and use the sensor information to determine the position of the vehicle.

Clause 17: The mobile device of any of clauses 10-16, wherein, to obtain the sensor information, the one or more processing units are configured to obtain movement information from the sensors, the movement information comprising: an Inertial Measurement Unit (IMU) sensor located on the vehicle, a wheel-speed sensor located on the vehicle, wireless signal measurements, a GNSS sensor located on the vehicle, or a camera sensor located on the vehicle, or any combination thereof.

Clause 18: The mobile device of any of clauses 10-17, wherein the first set of parameter values and the second set of parameter values are descriptive of the lane boundary in two dimensions such that a projection of the lane boundary from a plane of the anchor frame onto an image plane of a camera located on the vehicle overlaps with a projection of the lane boundary from a plane of the anchor frame onto the image plane.

Clause 19: A device comprising: means for determining, at a first time, a first set of parameter values descriptive of a lane boundary along a first portion of a road on which a vehicle is located, wherein the first set of parameter values are determined with respect to a first frame of reference; means for determining, subsequent to the first time, a position of the vehicle with respect to the first frame of reference; and means for determining, at a second time subsequent to determining the position of the vehicle, a second set of parameter values descriptive of the lane boundary along a second portion of the road, wherein: the second set of parameter values are determined with respect to an anchor frame comprising a second frame of reference, and the second set of parameter values are determined in response to a trigger event.

Clause 20: The device of clause 19, wherein the trigger event comprises: a length of time having elapsed since the first time, a distance travelled by the vehicle since the first time, or an uncertainty value having grown since the first time, or any combination thereof.

Clause 21: The device of clause 19 or 20, further comprising means for providing output information, the output information indicative of the determined position of the vehicle, the second set of parameter values descriptive of the lane boundary, or both.

Clause 22: The device of any of clauses 20-21, wherein the means for providing the output information comprises means for providing the output information to: an Advanced Driver-Assist System (ADAS) of the vehicle, or a user interface of the vehicle, or both.

Clause 23: The device of any of clauses 20-22, wherein the first portion of the road at least partially overlaps with the second portion of the road.

Clause 24: The device of any of clauses 20-23, wherein the first set of parameter values and the second set of parameter values include values for parameters comprising: a heading of the lane boundary, a curvature of the lane boundary, an offset of the lane boundary, or a point on the lane boundary, or any combination thereof.

Clause 25: The device of any of clauses 20-24, wherein the means for determining of the position of the vehicle comprises: means for obtaining sensor information, indicative of movement of the vehicle along the road, and means for using the sensor information to determine the position of the vehicle.

Clause 26: The device of any of clauses 20-25, wherein the means for obtaining the sensor information comprises means for obtaining movement information from: an Inertial Measurement Unit (IMU) sensor located on the vehicle, a wheel-speed sensor located on the vehicle, wireless signal measurements, a GNSS sensor located on the vehicle, or a camera sensor located on the vehicle, or any combination thereof.

Clause 27: The device of any of clauses 20-26, wherein the first set of parameter values and the second set of parameter values are descriptive of the lane boundary in two dimensions such that a projection of the lane boundary from a plane of the anchor frame onto an image plane of a camera located on the vehicle overlaps with a projection of the lane boundary from a plane of the anchor frame onto the image plane.

Clause 28: A non-transitory computer-readable medium storing instructions for lane mapping and localization of a vehicle on a road, the instructions comprising code for: determining, at a first time, a first set of parameter values descriptive of a lane boundary along a first portion of the road, wherein the first set of parameter values are determined with respect to a first frame of reference; subsequent to the first time, determining a position of the vehicle with respect to the first frame of reference; and subsequent to determining the position of the vehicle, determining, at a second time, a second set of parameter values descriptive of the lane boundary along a second portion of the road, wherein: the second set of parameter values are determined with respect to an anchor frame comprising a second frame of reference, and the second set of parameter values are determined in response to a trigger event.

Clause 29: The non-transitory computer-readable medium of clause 28, wherein the instructions further comprise code for detecting the trigger event, wherein the trigger event comprises: a length of time having elapsed since the first time, a distance travelled by the vehicle since the first time, or an uncertainty value having grown since the first time, or any combination thereof.

Clause 30: The non-transitory computer-readable medium of clause 28 or 29, wherein the instructions further comprise code for providing output information, the output information indicative of the determined position of the vehicle, the second set of parameter values descriptive of the lane boundary, or both.

What is claimed is:

1. A method of lane mapping and localization of a vehicle on a road, the method comprising:
   at a first time, setting a reference frame to a first anchor frame comprising a first frame of reference;
   while the reference frame is the first anchor frame:
      determining, with respect to the reference frame, a first set of parameter values for a lane boundary state representing a tracked lane boundary;
      updating the tracked lane boundary based on an association of a first candidate lane boundary with the tracked lane boundary; and
      determining a position of the vehicle with respect to the tracked lane boundary;
   at a second time subsequent to determining the position of the vehicle, in response to a trigger event, changing the reference frame to a second anchor frame comprising a second frame of reference; and
   while the reference frame is the second anchor frame:
      determining, with respect to the reference frame, a second set of parameter values for the lane boundary state; and
      updating the tracked lane boundary based on an association of a second candidate lane boundary with the tracked lane boundary.

2. The method of claim 1, wherein the trigger event comprises:
   a length of time having elapsed since the first time,
   a distance travelled by the vehicle since the first time, or
   an uncertainty value having grown since the first time, or any combination thereof.

3. The method of claim 1, further comprising providing output information comprising information indicative of the determined position of the vehicle, the second set of parameter values, or both.

4. The method of claim 3, wherein providing the output information comprises providing the output information to:
   an Advanced Driver-Assist System (ADAS) of the vehicle, or
   a user interface of the vehicle, or
   both.

5. The method of claim 1, wherein the first set of parameter values and the second set of parameter values include values for parameters comprising:
   a heading of the lane boundary,
   a curvature of the lane boundary,
   an offset of the lane boundary, or
   a point on the lane boundary, or
   any combination thereof.

6. The method of claim 1, wherein the determining of the position of the vehicle comprises:
   obtaining sensor information, indicative of movement of the vehicle, and
   using the sensor information to determine the position of the vehicle.

7. The method of claim 6, wherein the sensor information comprises movement information from:
   an Inertial Measurement Unit (IMU) sensor located on the vehicle,
   a wheel-speed sensor located on the vehicle,
   wireless signal measurements,
   a GNSS sensor located on the vehicle, or
   a camera sensor located on the vehicle, or
   any combination thereof.

8. The method of claim 1, wherein the first set of parameter values and the second set of parameter values are descriptive of the lane boundary in two dimensions, such that a projection of the lane boundary from a plane of the anchor frame, onto an image plane of a camera located on the vehicle, overlaps with a projection of the lane boundary from a plane of the anchor frame onto the image plane.

9. A mobile device comprising:
   sensors;
   a memory; and
   one or more processing units communicatively coupled with the sensors and the memory, the one or more processing units configured to:
      at a first time, set a reference frame to a first anchor frame comprising a first frame of reference;
      while the reference frame is the first anchor frame:
         determine, with respect to the reference frame, a first set of parameter values for a lane boundary state representing a tracked lane boundary;
         update the tracked lane boundary based on an association of a first candidate lane boundary with the tracked lane boundary; and
         determine a position of the vehicle with respect to the tracked lane boundary;
      at a second time subsequent to determining the position of the vehicle, in response to a trigger event, change the reference frame to a second anchor frame comprising a second frame of reference; and
      while the reference frame is the second anchor frame:
         determine, with respect to the reference frame, a second set of parameter values for the lane boundary state; and
         update the tracked lane boundary based on an association of a second candidate lane boundary with the tracked lane boundary.

10. The mobile device of claim 9, wherein the one or more processing units are further configured to detect the trigger event, wherein the trigger event comprises:
   a length of time having elapsed since the first time,
   a distance travelled by the vehicle since the first time, or
   an uncertainty value having grown since the first time, or any combination thereof.

11. The mobile device of claim 9, wherein the one or more processing units are further configured to provide output information, the output information indicative of the determined position of the vehicle, the second set of parameter values, or both.

12. The mobile device of claim 11, wherein the one or more processing units are configured to provide the output information to:
   an Advanced Driver-Assist System (ADAS) of the vehicle, or
   a user interface of the vehicle, or
   both.

13. The mobile device of claim 9, wherein the first set of parameter values and the second set of parameter values include values for parameters comprising:
   a heading of the lane boundary,
   a curvature of the lane boundary,
   an offset of the lane boundary, or
   a point on the lane boundary, or
   any combination thereof.

14. The mobile device of claim 9, wherein, to determine the position of the vehicle, the one or more processing units are configured to:
   obtain sensor information from the sensors, the sensor information indicative of movement of the vehicle, and
   use the sensor information to determine the position of the vehicle.

15. The mobile device of claim 14, wherein, to obtain the sensor information, the one or more processing units are configured to obtain movement information from the sensors, the movement information comprising:
- an Inertial Measurement Unit (IMU) sensor located on the vehicle,
- a wheel-speed sensor located on the vehicle,
- wireless signal measurements,
- a GNSS sensor located on the vehicle, or
- a camera sensor located on the vehicle, or
- any combination thereof.

16. The mobile device of claim 9, wherein the first set of parameter values and the second set of parameter values are descriptive of the lane boundary in two dimensions such that a projection of the lane boundary from a plane of the anchor frame onto an image plane of a camera located on the vehicle overlaps with a projection of the lane boundary from a plane of the anchor frame onto the image plane.

17. A device comprising:
- means for, at a first time, setting a reference frame to a first anchor frame comprising a first frame of reference;
- means for, while the reference frame is the first anchor frame:
  - determining, with respect to the reference frame, a first set of parameter values for a lane boundary state representing a tracked lane boundary;
  - updating the tracked lane boundary based on an association of a first candidate lane boundary with the tracked lane boundary; and
  - determining a position of the vehicle with respect to the tracked lane boundary;
- means for, at a second time subsequent to determining the position of the vehicle, in response to a trigger event, changing the reference frame to a second anchor frame comprising a second frame of reference; and
- means for, while the reference frame is the second anchor frame:
  - determining, with respect to the reference frame, a second set of parameter values for the lane boundary state; and
  - updating the tracked lane boundary based on an association of a second candidate lane boundary with the tracked lane boundary.

18. The device of claim 17, wherein the trigger event comprises:
- a length of time having elapsed since the first time,
- a distance travelled by the vehicle since the first time, or
- an uncertainty value having grown since the first time,
- or any combination thereof.

19. The device of claim 17, further comprising means for providing output information, the output information indicative of the determined position of the vehicle, the second set of parameter values, or both.

20. The device of claim 19, wherein the means for providing the output information comprises means for providing the output information to:
- an Advanced Driver-Assist System (ADAS) of the vehicle, or
- a user interface of the vehicle, or
- both.

21. The device of claim 17, wherein the first set of parameter values and the second set of parameter values include values for parameters comprising:
- a heading of the lane boundary,
- a curvature of the lane boundary,
- an offset of the lane boundary, or
- a point on the lane boundary, or
- any combination thereof.

22. The device of claim 17, wherein the means for determining the position of the vehicle comprises:
- means for obtaining sensor information, indicative of movement of the vehicle, and
- means for using the sensor information to determine the position of the vehicle.

23. The device of claim 22, wherein the means for obtaining the sensor information comprises means for obtaining movement information from:
- an Inertial Measurement Unit (IMU) sensor located on the vehicle,
- a wheel-speed sensor located on the vehicle, wireless signal measurements,
- a GNSS sensor located on the vehicle, or
- a camera sensor located on the vehicle, or
- any combination thereof.

24. The device of claim 17, wherein the first set of parameter values and the second set of parameter values are descriptive of the lane boundary in two dimensions such that a projection of the lane boundary from a plane of the anchor frame onto an image plane of a camera located on the vehicle overlaps with a projection of the lane boundary from a plane of the anchor frame onto the image plane.

25. A non-transitory computer-readable medium storing instructions for lane mapping and localization of a vehicle on a road, the instructions comprising code for:
- at a first time, setting a reference frame to a first anchor frame comprising a first frame of reference;
- while the reference frame is the first anchor frame:
  - determining, with respect to the reference frame, a first set of parameter values for a lane boundary state representing a tracked lane boundary;
  - updating the tracked lane boundary based on an association of a first candidate lane boundary with the tracked lane boundary; and
  - determining a position of the vehicle with respect to the tracked lane boundary;
- at a second time subsequent to determining the position of the vehicle, in response to a trigger event, changing the reference frame to a second anchor frame comprising a second frame of reference; and
- while the reference frame is the second anchor frame:
  - determining, with respect to the reference frame, a second set of parameter values for the lane boundary state; and
  - updating the tracked lane boundary based on an association of a second candidate lane boundary with the tracked lane boundary.

26. The non-transitory computer-readable medium of claim 25, wherein the instructions further comprise code for detecting the trigger event, wherein the trigger event comprises:
- a length of time having elapsed since the first time,
- a distance travelled by the vehicle since the first time, or
- an uncertainty value having grown since the first time,
- or any combination thereof.

27. The non-transitory computer-readable medium of claim 25, wherein the instructions further comprise code for providing output information, the output information indicative of the determined position of the vehicle, the second set of parameter values, or both.

* * * * *